(12) United States Patent
Tamminga et al.

(10) Patent No.: US 10,533,885 B2
(45) Date of Patent: Jan. 14, 2020

(54) DISPENSING DEVICE FOR POWDERS

(71) Applicant: Daneme Holding B.V., Santpoort-Noord (NL)

(72) Inventors: Jan Bartele Tamminga, Heerhugowaard (NL); Rob Gerardus Hermanus Bodde, Denekamp (NL)

(73) Assignee: Daneme Holding B.V., Santpoort-Noord (NL)

( * ) Notice: Subject to any disclaimer, the term of this patent is extended or adjusted under 35 U.S.C. 154(b) by 0 days.

(21) Appl. No.: 15/919,299

(22) Filed: Mar. 13, 2018

(65) Prior Publication Data
US 2018/0266868 A1 Sep. 20, 2018

(30) Foreign Application Priority Data

Mar. 14, 2017 (EP) ..................... 17160820

(51) Int. Cl.
*G01F 11/46* (2006.01)
*G01F 11/24* (2006.01)
*B65B 1/36* (2006.01)

(52) U.S. Cl.
CPC .............. *G01F 11/46* (2013.01); *G01F 11/24* (2013.01); *B65B 1/36* (2013.01)

(58) Field of Classification Search
CPC .......... G01F 11/46; G01F 11/24; G01F 11/40; B65B 1/36
See application file for complete search history.

(56) References Cited

U.S. PATENT DOCUMENTS

| 3,774,814 A | 11/1973 | Vidjak |
| 4,709,837 A | 12/1987 | Erdman |
| 2007/0295755 A1* | 12/2007 | Kinzie .................... G01F 11/24 222/239 |

FOREIGN PATENT DOCUMENTS

| CH | 445879 A | 10/1967 | |
| DE | 2937357 A1 | 9/1980 | |
| EP | 1640501 A2 | 3/2006 | |
| EP | 1640501 A3 | 9/2006 | |
| EP | 2913286 A1 | 9/2015 | |
| GB | 2030507 A * | 4/1980 | ............. B28B 5/027 |
| WO | 2005114115 A1 | 12/2005 | |

* cited by examiner

*Primary Examiner* — Donnell A Long
(74) *Attorney, Agent, or Firm* — N.V. Nederlandsch Octrooibureau; Catherine A. Shultz; Katelyn J. Bernier

(57) ABSTRACT

A dispensing device for dispensing a powder includes a container body for storing a powder and a rotatable disc shaped member arranged at a bottom side of the container body. The disc shaped member includes an axial side surface configured for engagement with the powder and wherein the axial side surface is provided with one or more radially extending storage slots each terminating at a corresponding radial side opening in a radial side surface of the disc shaped member. The dispensing device further comprises a rake member movably arranged along the axial side surface and configured for raking a predetermined amount of powder from one of the one or more storage slots through the corresponding radial side opening in a dispensing configuration of the dispensing device.

14 Claims, 3 Drawing Sheets

DISPENSING DEVICE FOR POWDERS

FIELD OF THE INVENTION

The present invention relates to a dispensing device, in particular a dispensing device for powders.

BACKGROUND ART

International patent application WO 2005/114115 A1 discloses a metering and dispensing closure for dispensing powder material from a container wherein two rotatable disks rotate in conjunction with a stationary cap member having a measuring chamber to afford accurate measuring of a powder material and dispensing of it. The disks and the container cap afford a consistent measuring of the powder material, as well as providing a variety of drive members which can be utilized with the dispensing closure.

The metering and dispensing closure mentioned above may suffer from clogging when the humidity level of powder material varies. Furthermore, the amount of powder material to be dispensed cannot be smaller than the storage capacity of the measuring chamber.

SUMMARY

The present invention seeks to provide a dispensing device for powders. The dispensing device can provide a less complex design whilst allowing for accurate quantities of powder to be dispensed, and the quantities of powder can be varied continuously when required.

According to an embodiment, a dispensing device of the type defined in the preamble is provided comprising a container body for storing a powder and a rotatable disc shaped member arranged at a bottom side of the container body, the disc shaped member comprising an axial side surface configured for engagement with a powder and wherein the axial side surface is provided with one or more radially extending storage slots each terminating at a corresponding radial side opening in a radial side surface of the disc shaped member, and wherein the dispensing device further comprises a rake member movably arranged along the axial side surface and configured for raking a predetermined amount of powder from one of the one or more storage slots through the corresponding radial side opening in a dispensing configuration of the dispensing device.

The rake member and disc shaped member comprising the one or more storage slots provide a relatively simple yet robust and reliable mechanism for accurately dispensing of powder. The disc shaped member can be rotated intermittently for successively aligning each storage slot with the rake member for dispensing a predetermined amount of powder from a storage slot momentarily aligned with the rake member. A further advantage of the rake member is that a storage slot need not be emptied at once, i.e. the rake member can be configured to rake an amount of powder from a storage slot significantly smaller than the (maximum) capacity of said storage slot, thereby enabling accurate dosing of small quantities of powder. The rake member of the present invention further allows for dispensing powders that may vary in humidity levels, particle thickness and so forth, so there is no need to provide an adapted or different rake member for each type of powder. As a result, the dispensing device of the present invention is versatile and can be used for a large variety of powder materials. Another advantage of the rake member is that the dispensing device is less prone to clogging as adequate and sufficiently high raking forces can be chosen to ensure that the one or more storage slots can be emptied and that no powder is left behind in a dispensing cycle.

Although any type of powder can in principle be dispensed by the dispensing device, the dispensing device of the present invention is very suitable for dispensing powders for use in the food and fragrance industry, such as powders that provide flavour, colour and/or scent.

BRIEF DESCRIPTION OF DRAWINGS

The present invention will be discussed in more detail below, with reference to the attached drawings, in which.

DETAILED DESCRIPTION

Figure 1:
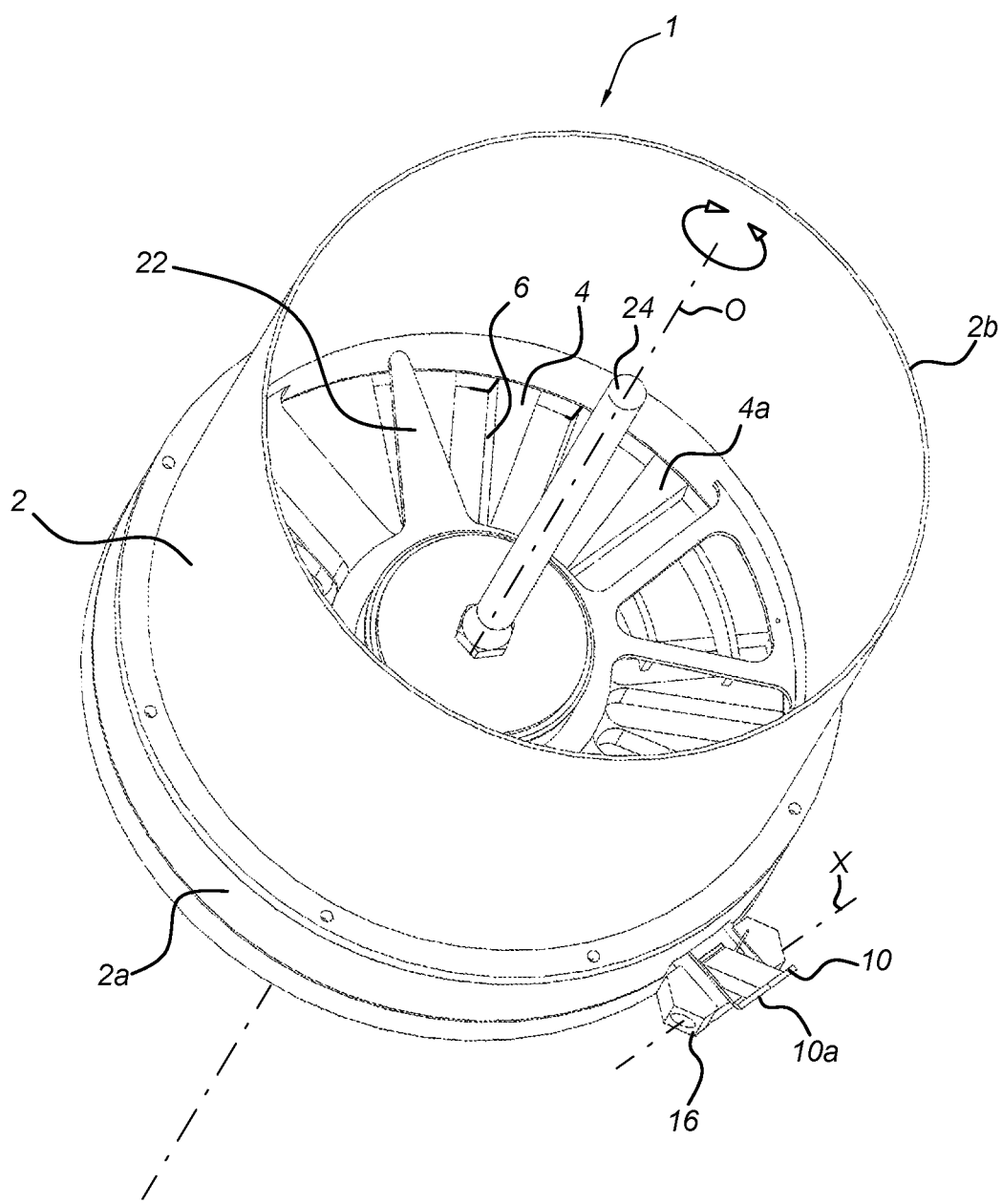
FIG. 1 shows a top perspective view of a dispensing device according to an embodiment of the present invention.
Figure 2:
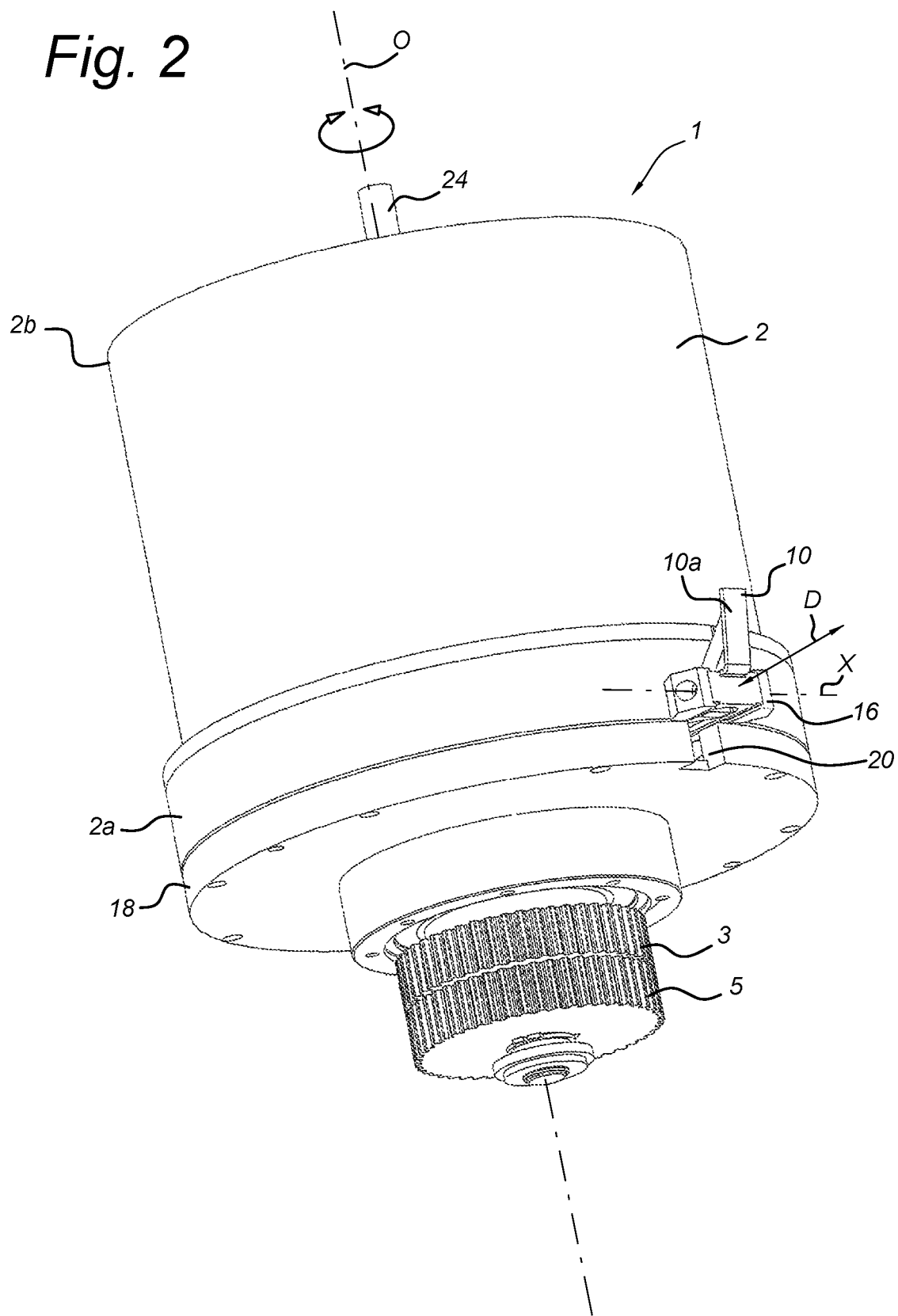
FIG. 2 shows a bottom perspective view of a dispensing device according to an embodiment of the present invention.
Figure 3:
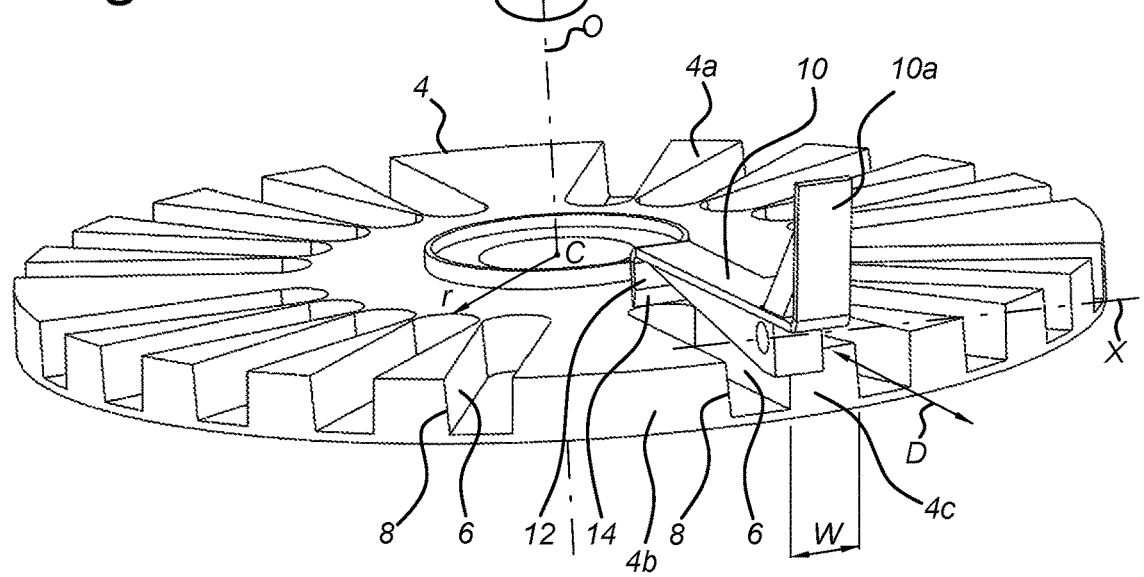
FIG. 3 shows a three dimensional view of a disc shaped member and rake member of a dispensing device according to an embodiment of the present invention.

FIGS. 1 and 2 show a top and bottom perspective view, respectively, of a dispensing device according 1 to an embodiment of the present invention, and FIG. 3 shows a disc shaped member 4 as used in a dispensing device according to an embodiment of the present invention.

In the embodiments shown, the dispensing device 1 of the present invention comprises a container body 2 for storing a powder, wherein the container body 2 comprises a bottom side 2a and a top side 2b, wherein the top side 2b is configured for filling the container body 2 with a powder of choice. At the bottom side 2a of the container body 2 there is arranged a rotatable disc shaped member 4, which may also be referred to as a storage disc 4. The disc shaped member 4 comprises an axial side surface 4a configured for engagement with the powder in the container body 2, i.e. the axial side surface 4a is a side surface of the disc shaped member 4 that faces the powder stored in the container body 2.

As shown in FIG. 1 and in more detail in FIG. 3, the axial side surface 4a is provided with one or more radially extending storage slots or grooves 6 each terminating at a radial side opening 8 in a radial side surface 4b of the disc shaped member 4. In particular, each storage slot/groove 6 may extend in radial fashion from a radial distance r as measured from a centre point C of the disc shaped member 4 to the radial side surface 4b of the disc shaped member 4. The radial side opening 8 is as such arranged in the radial side surface 4b and, see e.g. FIG. 3, may be viewed as representing a cross section of a storage slot 6. Without loss of generality, in the exemplary embodiments depicted the one or more storage slots 6 are straight storage slots 6.

The dispensing device 1 further comprises a rake member 10 movably arranged along the axial side surface 4a and which is configured for raking a predetermined amount of powder from one of the one or more storage slots 6 through the corresponding radial side opening 8 of the disc shaped body 4 in a dispensing configuration of the dispensing device 1, i.e. during a dispensing cycle.

According to the present invention, the rake member 10 may be viewed as a hook-like tool allowing powder contained in a storage slot 6 to be pulled out therefrom through the corresponding radial side opening 8 in accurate and reliable fashion, so that the use of complex pneumatic techniques are avoided. The rake member 10 further reduces clogging of the dispensing device 1, particularly for powders exhibiting elevated humidity levels as adequate and sufficient raking forces can be imposed to ensure that a storage slot 6 is emptied. An advantage of the disc shaped member 4 is that the one or more radially extending storage slots 6 can be filled reliably as they form relatively large radially extending cavities providing good accessibility for a powder engaging the axial side surface 4a of the disc shaped member 4.

In an advantages embodiment, the rake member 10 comprises a flat tip portion 12 as depicted in FIG. 3. In this embodiment the flat tip portion 12 provides a large surface area that facilitates raking action when a powder from the one or more storage slots 6 is to be dispensed. In a particular embodiment the flat tip portion 12 may have a width that corresponds to a width of the storage slots 6 to ensure that the raking member 10 is able to dispense an accurate amount of powder. For example, the width of the flat tip portion 12 may be chosen to allow for snug but smooth movement of the flat tip portion 12 through the storage slot 6. In a further embodiment, the flat tip portion 12 may comprise a tapered edge 14, which facilitates insertion of the flat tip portion 12 into a powder contained within a storage slot 6. In this embodiment the tapered edge 14 also provides enhanced cutting capability to the rake member 10 for powders having higher densities.

According to the present invention, the rake member 10 is movably arranged along the axial side surface 4a of the disc shaped member 4, wherein movement of the rake member 10 is allowed in the dispensing configuration of the dispensing device 1. For example, in the dispensing configuration, i.e. during the dispensing cycle, the disc shaped member 4 is put into a stationary position and one of the one or more radially extending storage slots 6 is aligned/registered in lengthwise fashion with the rake member 10. In the dispensing configuration the rake member 10 is able to move in and out of the dispensing device 1 along the aligned storage slot 6 such that powder contained therein can be raked and dispensed accordingly. When the storage slot 6 has been emptied by the rake member 10, the disc shaped member 4 rotates for aligning/registering a subsequent storage slot 6 with the rake member 10.

So in view of the above there is provided an embodiment wherein the rake member 10 is linearly movable along the storage slot 6 over a predetermined raking distance. Note that the raking distance may, but need not, be equal to the total length of a storage slot 6. The predetermined raking distance may therefore be chosen to merely dispense an amount of powder less than a (total) weight capacity or volumetric capacity of a storage slot 6. Furthermore, the predetermined raking distance need not be fixed for each storage slot 6, and so in an advantageous embodiment the raking distance may be an adjustable raking distance, thereby allowing the dispensing device 1 to be configured for dispensing any amount of powder required, including amounts of powder that are much smaller than a (total) weight or volumetric capacity of a storage slot 6. The raking distance may therefore be adjustable between the one or more storage slots 6 as it is conceivable that for some applications a particular storage slot 6 must be completely emptied during a single raking cycle whilst a subsequent storage slot 6 may only be partly emptied.

Note that in the FIGS. 1 to 4 the rake member 10 is positioned at a maximum raking distance with respect to a storage slot 6, thus wherein the rake member 10 is maximally inserted into the dispensing device 1 for raking a maximum amount of powder from a storage slot 6 during a single raking cycle. Each of the depicted rake members 10 are linearly movably along a storage slot 6 as indicated by a linear direction "D" along the axial side surface 4a over the maximum raking distance.

In an exemplary embodiment the disc shaped member 4 is rotatable about a central, lengthwise axis O, which may coincide with a central lengthwise axis of the dispensing device 1. Through intermittent rotation about the lengthwise axis O, each of the one or more storage slots 6 may be temporally aligned/registered with the rake member 10. To rotate the disc shaped member 4, an embodiment is provided wherein the disc shaped member 4 is connected to a disc driving member 3, e.g. a gear 3, configured to be rotated by a suitable drive unit.

Movement and motion of the rake member 10 can be accomplished in various ways. For example, in an embodiment the rake member 10 is pivotally arranged between a retraction angle and an insertion angle. In this embodiment the retraction angle corresponds to the rake member 10 being retracted or raised from the storage slot 6 and wherein the insertion angle corresponds to the rake member 10 being inserted or lowered, at least in part, into the storage slot 6. For example, in case the rake member 10 comprises a flat tip portion 12, said tip portion 12 can be retracted or raised from a storage slot 6 by pivoting the rake member 10 toward the retraction angle. Conversely, in case the rake member 10 comprises a flat tip portion 12, said tip portion 12 can be inserted or lowered into a storage slot 6 by pivoting the rake member 10 toward the insertion angle. FIGS. 1 to 4 each show an embodiment of a rake member 10 which is pivotally arranged about a pivot axis "X", and wherein the rake member 10 is pivoted toward or positioned at the insertion angle.

A pivotally arranged rake member 10 provides a simple yet reliable solution for raising and lowering the rake member 10, e.g. a tip portion thereof, from and into a storage slot 6. As such the rake member 10 may be viewed as a lever-like member with which relative large raking forces can be imposed to ensure that accurate amounts of powder of various types can be dispensed, e.g. powders having varying densities, particle sizes, humidity levels etc.

In an embodiment the dispensing device 1 further comprises a biasing member (not shown) connected to the rake member 10, and wherein the biasing member is configured for biasing the rake member 10 toward the retraction angle, i.e. toward a raised position of the rake member 10. The biasing member may be embodied in various ways, such as a resilient spring element biasing the rake member 10 toward the retraction angle. This embodiment allows, for example, for a one-way pivoting actuator configured for pivoting the rake member 10 from the retraction angle toward the insertion angle, i.e. toward the lowered position of the rake member 10. When such a one-way pivoting actuator is disengaged, the biasing member ensures that the rake member 10 is biased toward the retraction angle and as such is biased toward the raised position with respect to a storage slot 6. Conversely, when the one-way pivoting actuator is engaged, the rake member 10 is pivoted from the retraction angle toward the insertion angle for lowering said rake member 10 toward the storage slot 6.

In a specific embodiment the rake member 10 may comprise an abutment portion 10a for contact engagement with e.g. a (one-way) pivoting actuator, thereby allowing releasable contact between the rake member 10 and the pivoting actuator yet enable the rake member 10 to be pivoted from the retraction angle toward the insertion angle.

Referring to FIGS. 1 and 2, according to the present invention the rake member 10 is movably arranged along the axial side surface 4a and configured for raking a predetermined amount of powder from one of the one or more storage slots 6. In an embodiment the rake member 10 is linearly movable in a linear direction "D" along one of the one or more storage slots 6 which is (momentarily) aligned with respect to the rake member 10 in the linear direction "D".

With reference to FIGS. 1 and 2, to move the rake member 10 along the axial side surface 4a and in particular along a storage slot 6, an external actuator member 16 may be provided which is movable relative to the dispensing device 1 and wherein the rake member 10 is attached to the external actuator member 16. This embodiment provides a convenient point of engagement between the dispensing device 1 and a further actuation system for moving the rake member 10 in and out of the dispensing device 1. For example, the external actuator member 16 may be a releasable actuator member 16 configured for releasable engagement with the further actuation system.

In the embodiments shown in FIGS. 1 and 2, and wherein the one or more storage slots 6 may be considered to be straight storage slots 6, an embodiment is provided wherein the external actuator member 16 is linearly movable in a lengthwise direction of one of the one or more storage slots 6 in the dispensing configuration of the dispensing device 1. In this embodiment the lengthwise direction corresponds to the linear direction "D" aligned with a storage slot 6.

In a further embodiment, the rake member 10 may be pivotally attached to the external actuator member 16 to enable pivoting motion of the rake member 10 between the retraction angle and the insertion angle in addition to the linear motion as described above. This embodiment provides linear motion/displacement to the rake member 10 through linear motion/displacement of the external actuator member 16 and further allows for a pivoting arrangement between the rake member 10 and the external actuator member 16. As a result the rake member 10, and in particular a tip portion thereof, is able to move into and out of the dispensing device 1 as well as being able to pivot between a lowered and raised position with respect to a storage slot 6.

Figure 4:
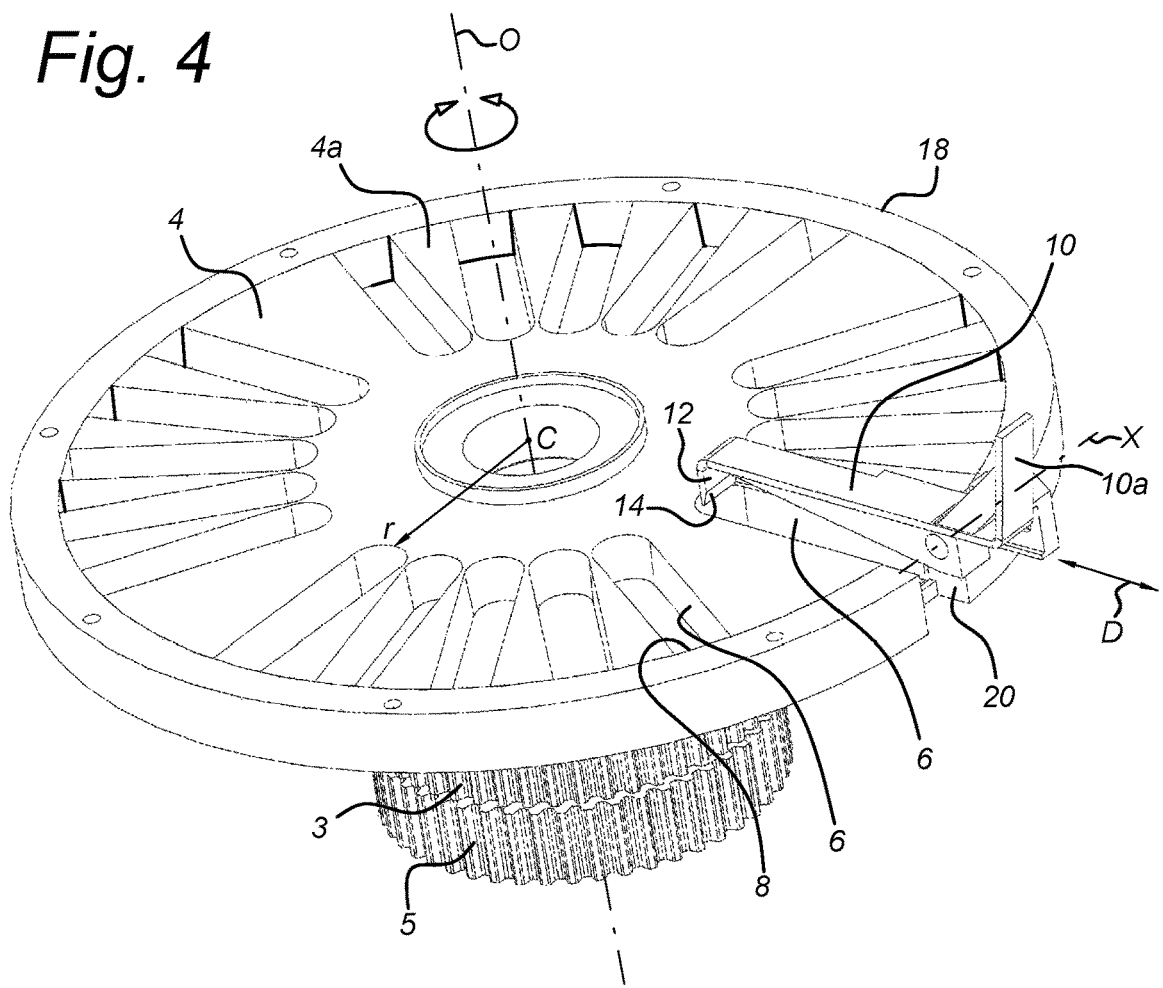
FIG. 4 shows a three dimensional view of a housing body in combination with a disc shaped member of a dispensing device according to a further embodiment of the present invention.

FIG. 4 shows a three dimensional view of a housing body 18 according to an embodiment of the present invention. In the embodiment shown, the dispensing device 1 may further comprise a housing body 18 radially enclosing at least in part the disc shaped member 4. In this embodiment the housing body 18 encloses at least in part the radial side surface 4b of the disc shaped member 4 such that one or more radial side openings 8 are covered or blocked by the housing body 18 to prevent leakage of powder when not in use for dispensing powder. As a result, powder stored in the container body 2 is able to reliably fill each storage slot 6 of which a corresponding radial side opening 8 is covered or blocked by the housing body 18. The housing body 18 therefore facilitates adequate filling of the one or more storage slots 6 by minimizing leakage of powder through radial side openings 8 thereof.

In an embodiment the housing body 18 comprises an opening/gap 20 in register with a corresponding radial side opening 8 of the disc shaped member 4 in the dispensing configuration of the dispensing device 1, i.e. during a dispensing cycle. The opening 20 in the housing body 18 is depicted in FIGS. 2 and 4. In the dispensing configuration a storage slot 6 and radial side opening 8 thereof are aligned with the opening 20 to provide access to the storage slot 6 by the rake member 10 and to allow powder to be dispensed from the dispensing device 1.

In the embodiment as shown in FIG. 3, the radial side surface 4b of the disc shaped member 4 may further comprise a wall portion 4c having a width "w" larger than a width of the opening 20 of the housing body 18. This allows the opening 20 to be blocked by the disc shaped member 4 when no powder needs to be dispensed or when the dispensing device 1 is not in use. Leakage of powder is thus prevented by positioning the disc shaped member 4 in such a way that the wall portion 4c of the disc shaped member 4 is aligned with the opening 20.

In an exemplary embodiment, the radial side surface 4b comprises a wall portion 4c between two successive radial side openings 8, wherein the wall portion 4c has a width "w" larger than a width of the opening 20 of the housing body 18. In this embodiment the opening 20 may be (temporarily) blocked when rotating the disc shaped member 4 for changing between successive storage slots 6, so that leakage of powder from the dispensing device 1 is prevented. In an embodiment, the disc shaped member 4 may have a height equal to or larger than a height of the opening 20, so that the above mentioned width "w" of the wall portion 4c with respect to the width of the opening 20 determines whether the opening 20 can be blocked by the wall portion 4c.

According to the present invention, the gravitational force acting on powder within the container body 2 may in most cases be sufficient for adequate filling of the one or more storage slots 6. This is often the case for a container body 2 which is substantially filled with powder. However, as shown in FIG. 1, in order to also ensure an even distribution of powder across the axial side surface 4a of the disc shaped member 4 when the container body 2 is nearly empty, the dispensing device 1 may further comprise a compactor member 22 rotationally arranged within the container body 2 and configured for distributing powder across the one or more storage slots 6. In this embodiment the compactor member 22 forces powder within the container body 2 to spread evenly across the axial side surface 4a and in particular the one or more storage slots 6. In this way the dispensing device 1 is able to dispense powder of consistent compaction from each of the one or more storage slots 6. The compactor member 22 further ensures each storage slot 6 is filled completely with powder and as such minimizes empty pockets within each storage slot 6.

In an exemplary embodiment the compactor member 22 is rotationally arranged about the central lengthwise axis O of the disc shaped member 4. Rotation of the compactor member 22 may be continuous or intermittent, whichever provides sufficient crushing of powder clumps and proper filling and distribution of powder across the one or more storage slots 6. To rotate the compactor member 22, an embodiment is provided wherein the compactor member 22 is connected to a compactor driving member 5, e.g. a further gear 5, configured to be rotated by a suitable drive unit. In a further embodiment, the compactor member 22 may also be driven by a compactor shaft member 24 extending through the container body 2.

As depicted in FIG. 2, both the disc and compactor driving member 3, 5 are positioned at the bottom side 2a of the container body 2 so that accessibility of the top side 2b is improved for providing powder to the container body 2.

According to the present invention, the dispensing device 1 is suitable for being used in a dispensing system for dispensing various types of powders, i.e. thus wherein the dispensing system utilizes a plurality of dispensing devices 1 as described above, and wherein each of the dispensing devices 1 may carry a different type of powder or mixture of powders.

In view of such a system, according to a further aspect of the present invention there is provided a dispensing system for dispensing powders comprising a plurality of dispensing devices 1 each of which comprises a container body 2 for storing a powder and a rotatable disc shaped member 4 arranged at a bottom side 2a of the container body 2, wherein the disc shaped member 4 comprises an axial side surface 4a configured for engagement with the powder and wherein the axial side surface 4a is provided with one or more radially extending storage slots 6 or grooves 6 each terminating at a corresponding radial side opening 8 in a radial side surface 4b of the disc shaped member 4, and wherein each dispensing device 1 further comprises a rake member 10 movably arranged along the axial side surface 4a and configured for raking a predetermined amount of powder from one of the one or more storage slots 6 through the corresponding radial side opening 8 of the disc shaped body 4 in a dispensing configuration of the dispensing device 1, e.g. during a dispensing cycle. The dispensing system further comprises a main actuation unit arranged for successive engagement with one or more rake members 10 of the plurality of dispensing devices 1.

According to a required dispensing sequence of powders, the dispensing system of the present invention allows a plurality of powders to be efficiently dispensed through a main actuation unit which is in successive engagement with one or more rake members 10 of the plurality of dispensing devices 1. For example, given a required mix of powders, the dispensing system may be configured to impose a particular successive engagement scheme to the main actuation unit with one or more rake members 10 to obtain the required mix of powders. Because each of the dispensing devices 1 as described above comprises a rake member 10 in cooperative engagement with the disc shaped member 4 and in particular the one or more radially extending storage slots 6, the overall complexity and cost of the dispensing system is greatly reduced whilst increasing operational reliability and versatility thereof.

In an advantageous embodiment each of the plurality of dispensing devices 1 is movably arranged with respect to the main actuation unit and wherein the main actuation unit is arranged for releasable engagement with the one or more rake members 10 of the plurality of dispensing devices 1. This embodiment allows for the plurality of dispensing devices 1 to form an automated pick and place arrangement, such as an X-Y-Z pick and place robot arrangement, wherein the main actuation member comes into contact with the one or more rake members 10 in successive and releasable fashion.

For example, as described earlier, the rake member 10 may be pivotally arranged and comprise an abutment portion 10a for e.g. contact engagement with a pivoting actuator. The main actuation unit of the dispensing system may then comprise such a pivoting actuator and allow for contact engagement between the pivoting actuator and the abutment portion 10a for moving the rake member 10 from the retraction angle toward the insertion angle, i.e. from the raised to the lowered position with respect to a storage slot 6. Such contact engagement between a pivoting actuator and abutment portion 10a of a rake member 10 greatly facilities convenient and reliable exchange between a plurality of dispensing devices 1 in e.g. an X-Y-Z pick and place robot arrangement, wherein a single, main actuation unit successively engages the plurality of dispensing devices 1.

The present invention has been described above with reference to a number of exemplary embodiments as shown in the drawings. Modifications and alternative implementations of some parts or elements are possible, and are included in the scope of protection as defined in the appended claims.

The invention claimed is:

1. A dispensing device for dispensing a powder, comprising a container body for storing a powder and a rotatable disc shaped member arranged at a bottom side of the container body,
   the disc shaped member comprising an axial side surface configured for engagement with the powder and wherein the axial side surface is provided with one or more radially extending storage slots each terminating at a corresponding radial side opening in a radial side surface of the disc shaped member, and wherein the dispensing device further comprises
   a rake member moveably arranged along the axial side surface and configured for raking a predetermined amount of powder from one of the one or more storage slots through the corresponding radial side opening in a dispensing configuration of the dispensing device,
   wherein the rake member is linearly moveable along the one of the one or more storage slots over a predetermined raking distance.

2. The dispensing device according to claim 1, wherein the rake member comprises a flat tip portion.

3. The dispensing device according to claim 2, wherein the flat tip portion comprises a sharpened raking edge.

4. The dispensing device according to claim 1, wherein the raking distance is an adjustable raking distance.

5. The dispensing device according to claim 1, wherein the rake member is pivotally arranged between a retraction angle and an insertion angle, wherein the retraction angle corresponds to the rake member being retracted from the one of the one or more storage slots and wherein the insertion angle corresponds to the rake member being inserted at least in part into the one of the one or more storage slots.

6. The dispensing device according to claim 5, further comprising a biasing member connected to the rake member, the biasing member being configured for biasing the rake member toward the retraction angle.

7. The dispensing device according to claim 1, further comprising an external actuator member moveable relative to the dispensing device, the rake member being attached to the external actuator member.

8. The dispensing device according to claim 7, wherein the external actuator member is linearly moveable in a lengthwise direction of the one of the one or more storage slots.

9. The dispensing device according to claim 7, wherein the rake member is pivotally attached to the external actuator member.

10. The dispensing device according to claim 1, further comprising a housing body radially enclosing at least in part the disc shaped member.

11. The dispensing device according to claim 10, wherein the housing body comprises an opening in register with the corresponding radial side opening of the disc shaped member in the dispensing configuration of the dispensing device.

12. The dispensing device according to claim 1, further comprising a compactor member rotationally arranged within the container body and configured for distributing powder across the one or more storage slots.

13. A dispensing system for powders, comprising a plurality of dispensing devices according to claim 1 and a main actuation unit arranged for successive engagement with one or more rake members of the plurality of dispensing devices.

14. The dispensing system according to claim 13, wherein each of the plurality of dispensing devices is moveably arranged with respect to the main actuation unit and wherein the main actuation unit is arranged for releasable engagement with the one or more rake members of the plurality of dispensing devices.

* * * * *